United States Patent
Futane et al.

(10) Patent No.: US 10,643,814 B2
(45) Date of Patent: May 5, 2020

(54) MEDIUM VOLTAGE CIRCUIT BREAKER IN SUBSEA ENVIRONMENT

(71) Applicant: ABB Schweiz AG, Baden (CH)

(72) Inventors: Pravin Futane, Bergen (NO); Paul Midtun, Bergen (NO); Knut S. Rongve, Fyllingsdalen (NO); Maik Hyrenbach, Ratingen (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 15/841,317

(22) Filed: Dec. 14, 2017

(65) Prior Publication Data

US 2018/0108504 A1    Apr. 19, 2018

Related U.S. Application Data

(63) Continuation of application No. PCT/EP2016/063914, filed on Jun. 16, 2016.

(30) Foreign Application Priority Data

Jun. 18, 2015 (EP) .................... 15172667

(51) Int. Cl.
*H01H 33/666* (2006.01)
*H01H 71/02* (2006.01)
(Continued)

(52) U.S. Cl.
CPC .......... *H01H 71/025* (2013.01); *H01H 71/08* (2013.01); *H02B 13/045* (2013.01);
(Continued)

(58) Field of Classification Search
CPC .. H01H 33/662; H01H 33/64; H01H 33/6606; H01H 33/66238; H01H 33/565; H01H 33/666; H01H 71/025; H01H 71/08; H01H 9/04; H02B 13/045; H02B 13/0354; H05K 7/00
(Continued)

(56) References Cited

U.S. PATENT DOCUMENTS 3,855,435 A * 12/1974 Himi .................. H01H 33/24
218/138
4,568,804 A    2/1986 Luhring
(Continued)

FOREIGN PATENT DOCUMENTS

CN    103050320 A    4/2013
CN    204011248 U    12/2014
(Continued)

*Primary Examiner* — William A Bolton
(74) *Attorney, Agent, or Firm* — Leydig, Voit & Mayer, Ltd.

(57) ABSTRACT

A medium voltage circuit breaker in a high pressure subsea environment includes: a vacuum circuit breaker; and a drive in a pressure tight housing. For an electrical three-phase arrangement, one vacuum circuit breaker per phase is arranged in a separate pole housing each, and the resulting three pole housings are mounted to a common base compartment, in which three drives for the three vacuum circuit breakers are arranged. The three pole housings and the common base compartment are attached such that they commonly form a pressure tight compartment.

6 Claims, 2 Drawing Sheets

(51) Int. Cl.
*H01H 71/08* (2006.01)
*H02B 13/035* (2006.01)
*H02B 13/045* (2006.01)

(52) U.S. Cl.
CPC . *H01H 2033/6665* (2013.01); *H02B 13/0352* (2013.01); *H02B 13/0354* (2013.01)

(58) Field of Classification Search
USPC .......... 218/100, 97, 134, 139, 155, 118, 84; 200/187, 188, 556
See application file for complete search history.

(56) References Cited

U.S. PATENT DOCUMENTS

| | | | |
|---|---|---|---|
| 5,912,604 A | 6/1999 | Harvey et al. | |
| 6,747,234 B2* | 6/2004 | Traska | H01H 33/24 218/134 |
| 6,927,355 B2* | 8/2005 | Thuresson | H01H 33/36 218/84 |
| 7,148,441 B2* | 12/2006 | Daharsh | H01C 7/12 218/136 |
| 7,397,012 B2* | 7/2008 | Stepniak | H01H 33/02 218/155 |
| 2016/0240338 A1* | 8/2016 | Dullni | H01H 9/04 |

FOREIGN PATENT DOCUMENTS

| | | |
|---|---|---|
| EP | 1496535 A1 | 1/2005 |
| EP | 1942514 A1 | 7/2008 |
| EP | 2341518 A1 | 7/2011 |
| WO | WO 2015028140 A1 | 3/2015 |

\* cited by examiner

MEDIUM VOLTAGE CIRCUIT BREAKER IN SUBSEA ENVIRONMENT

CROSS-REFERENCE TO PRIOR APPLICATION

This application is a continuation of International Patent Application No. PCT/EP2016/063914, filed on Jun. 16, 2016, which claims priority to European Patent Application No. EP 15172667.6, filed on Jun. 18, 2015, the entire disclosures of which are hereby incorporated by reference herein.

FIELD

The invention relates to a medium voltage circuit breaker in high pressure subsea environment, with a vacuum circuit breaker in a pressure tight housing.

BACKGROUND

A known state of the art, U.S. Pat. No. 4,568,804, disclosure is shown in the FIG. 2. An insulating housing 1a and 1b, that contains a switching element 2 is located in an environment of high pressurized fluid. For example this can be a vacuum interrupter in a subsea application. The vacuum interrupter has to be protected against the high pressures, which can reach 300 bar or more. Therefore a pole part is needed, that withstands the pressure and keeps an atmospheric environment of 1-3 bar at the outer surface of the vacuum interrupter itself. The high pressurized fluid around is insulating fluid. This is in an enclosure on the seabed in order to prevent damage from contact with the seawater.

SUMMARY

In an embodiment, the present invention provides a medium voltage circuit breaker in high pressure subsea environment, comprising: a vacuum circuit breaker; and a drive in a pressure tight housing, wherein for an electrical three-phase arrangement, one vacuum circuit breaker per phase is in arranged in a separate pole housing each, and the resulting three pole housings are mounted to a common base compartment, in which all the three drives for the three vacuum circuit breaker are arranged, and wherein the three pole housings and the common base compartment are attached such that they form commonly a pressure tight compartment.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
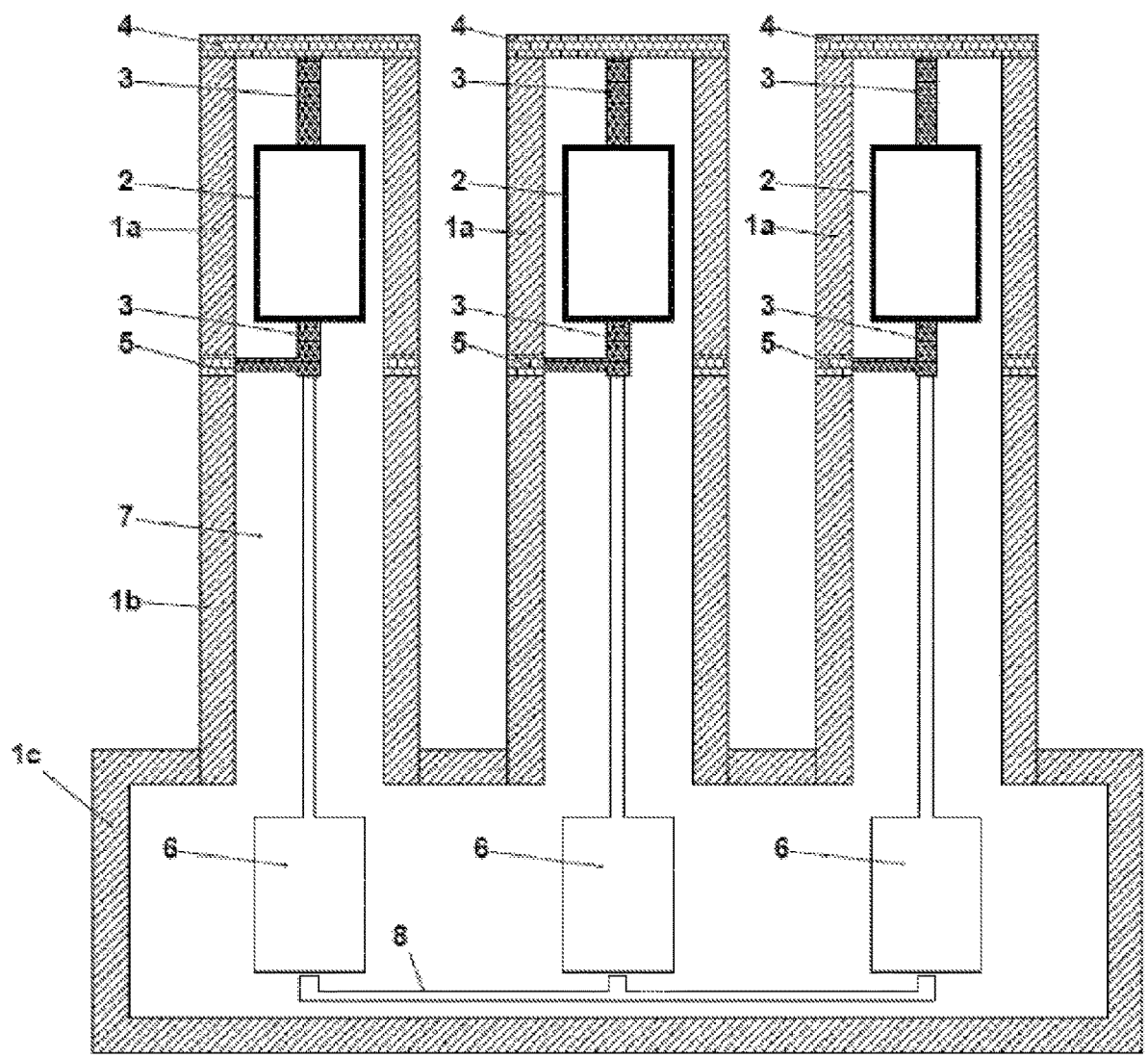
FIG. 1 shows an embodiment of the invention.

The invention is, that for an electrical three-phase arrangement, one vacuum circuit breaker per phase is in arranged in a separate pole housing each, and the resulting three pole housings are mounted to a common base compartment, in which all the three drives for the three vacuum circuit breaker are arranged in, and that the three pole housings and the common base compartment are attached in such, that they form commonly a pressure tight compartment. So the drives are located in a common compartment. But, there is no need for three separated compartment for each drive, but only one common compartment for all the three drives. So finally the pole houses and the common base compartment commonly form a gastight compartment for high withstand against high environmental pressure. By that the complete switchgear arrangement is easier to construct with such high pressure tightness from outside to inside.

One important embodiment of the invention is, that the external contacts of the circuit breaker are made of conducting material and at least one of the external contacts is or are integral part of the pressure tight housing. That means, that at least on of the external contacts are not constructed like a bushing, whiches thightness in that pressure range would be difficult.

So at least one contact, for example the top contact is not a bushing through a top cap of the insulating housing, but the top lid of the housing itself, which is fixed on top and using a sealing.

An advantageous embodiment is, that the drives are mounted inside the common compartment each on a separate frame.

A further advantageous embodiment is, that the three drives are mechanically linked together in such, if one or two drives fails to work, the force of the two remaining working drives is strong enough to switch all three vacuum circuit breaker in common. By that a high performance level of security is given, which is important for deepsea applications, because maintenance is not such easy then under normal environmental pressure.

In a further advantageous embodiment the three drives in the common compartment are connected to one common signal wire system, feed into the common compartment by only one bushing.

One big advantage of this embodiment is resulting in the fact, that the drives can be electrically connected to the signal wire in parallel or in line, depending to the desired functionality. So by the common compartment for all drives of a three-phase arrangement, only one bushing for the electrical signal wiring for the drives is needed.

For high pressure environment, the partial volumina of the three pole housings and the volume of the common compartment for the drives are coherently resulting in a common volumina, which is pressure tight against high environmental pressure of 300 bar or above in such, that the inner pressure results at round about 1 to 3 bar in total.

In a further advantageous embodiment is defined, that the common volumina is filled with an insulating gas.

According to that, the insulating gas is sulfurhexafluoride (SF6).

According to FIG. 1, for the electrical connection 3 to the switching element 2, there is a conducting lid 4. Furthermore there is a conducting ring 5. These conducting elements 4, 5 are the contacts itself. These contacts 4 and 5 have to provide a good electrical connection. As well, they are part of the housing and have to be tight against leakage and stable against the pressure on the outside. In line with the vacuum interrupter 2, there is a drive 6, that operates on low voltage. To have this appropriate for a medium voltage application, the housing parts 1a and 1b have to be made at least partly of insulating material. Furthermore the volume 7 can be filled with an insulating gaseous medium like SF6.

Figure 2:
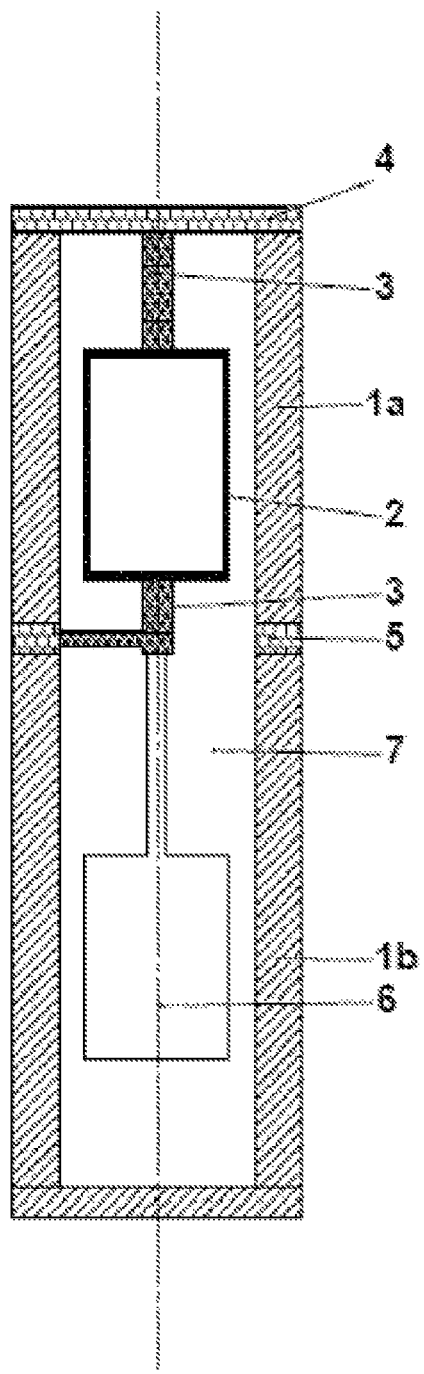
FIG. 2 shows a state of the art circuit breaker for a single current path.

The design according to FIG. 2, as state of the art, is a Circuit Breaker for a single current path. Its application is mostly given in three-phase-networks, where always three poles operate simultaneously. That means, that always three poles have to be grouped in a switchgear arrangement and thus fixed to a frame and surrounding enclosure.

What is proposed in this invention disclosure is shown in FIG. 1. Three pole housings are mounted to a common housing 1c. This housing part can be conducting or insulating because it is not in vicinity of the high voltage potential of the contacts 3 and 4 or the switching element 2. The drives are supported on frames. This creates a three-phase-circuit-breaker, that can be handled and tested as a unit. Furthermore, this allows to implement a mechanical link 8, that prevents a critical situation in case of a failed drive, because it provides a common opening of the switching elements. In normal condition every pole is operated by its own drive. If one drive fails, the energy of the remaining two drives is high enough to operate all three poles, at least in the more critical OFF operation.

In addition the number of required low voltage signals or operating voltages to pass the housing can be reduced, as the electrical connections of the three drives can be connected in parallel or in line, depending on the function. This reduces the risk of leakage and the costs for the expensive bushings.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1a housing part
1b housing part
1c common housing part
2 switching element
3 contact
4 contact
5 conducting ring
6 drive
7 volume
8 mechanical link

What is claimed is:

1. A medium voltage circuit breaker for a high pressure subsea environment, comprising:
   three switching elements, so as to provide an electrical three-phase arrangement with one switching element per phase; and
   three drives, one drive for each switching element, the three drives being mounted inside a common base compartment,
   wherein each of the three switching elements is arranged in a separate pole housing, to form three pole housings, the three pole housings being mounted to the common base compartment,
   wherein the three pole housings and the common base compartment form a pressure tight compartment comprising a single volume that is bounded by the three pole housings and the common base compartment, and
   wherein each switching element has internal contacts on either side thereof, such that the internal contacts of each switching element are exposed to the single volume.

2. The medium voltage circuit breaker according to claim 1, wherein external contacts of the circuit breaker comprise a conducting material and at least one of the external contacts is or are an integral part of the pressure tight compartment.

3. The medium voltage circuit breaker according to claim 1, wherein the three drives are mechanically linked together such that, if one of the drives fails, a force of the remaining working drives is strong enough to switch all three switching elements.

4. The medium voltage circuit breaker according to claim 1, wherein the single volume is pressure tight against high environmental pressure of 300 bar or more, such that an inner pressure of the single volume is about 1 to 3 bar in total.

5. The medium voltage circuit breaker according to claim 4, wherein the single volume is filled with an insulating gas.

6. The medium voltage circuit breaker according to claim 5, wherein the insulating gas comprises sulfurhexafluoride (SF6).

* * * * *